United States Patent
Schreyer et al.

(10) Patent No.: US 10,949,944 B2
(45) Date of Patent: *Mar. 16, 2021

(54) SYSTEM AND METHOD FOR UNIFIED APPLICATION PROGRAMMING INTERFACE AND MODEL

(71) Applicant: Apple Inc., Cupertino, CA (US)

(72) Inventors: Richard W. Schreyer, Scotts Valley, CA (US); Kenneth C. Dyke, Los Altos, CA (US); Alexander K. Kan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/390,577

(22) Filed: Apr. 22, 2019

(65) Prior Publication Data

US 2019/0251656 A1  Aug. 15, 2019

Related U.S. Application Data

(63) Continuation of application No. 14/502,073, filed on Sep. 30, 2014, now Pat. No. 10,346,941.

(Continued)

(51) Int. Cl.
*G06T 1/20* (2006.01)
*G06F 9/30* (2018.01)
*G06F 9/54* (2006.01)

(52) U.S. Cl.
CPC ............ *G06T 1/20* (2013.01); *G06F 9/30145* (2013.01); *G06F 9/545* (2013.01); *G06T 2200/28* (2013.01)

(58) Field of Classification Search
None
See application file for complete search history.

(56) References Cited

U.S. PATENT DOCUMENTS

| | | |
|---|---|---|
| 5,179,702 A | 1/1993 | Spix |
| 5,313,614 A | 5/1994 | Goettelmann |

(Continued)

FOREIGN PATENT DOCUMENTS

| | | |
|---|---|---|
| CN | 102027446 A | 4/2011 |
| CN | 102099788 A | 6/2011 |

(Continued)

OTHER PUBLICATIONS

"Metal Programming Guide Contents," Mar. 9, 2015 (Mar. 9, 2015), pp. 1-74, XP055207633, Retrieved from the Internet: URL: https://developer.apple.com/library/ios/documentation/Miscellaneous/Conceptual/MetalProgrammingGuide/MetalProgrammingGuide.pdf [retrieved on Aug. 13, 2015].

(Continued)

*Primary Examiner* — Jeffrey J Chow
(74) *Attorney, Agent, or Firm* — Blank Rome LLP

(57) ABSTRACT

Systems, computer readable media, and methods for a unified programming interface and language are disclosed. In one embodiment, the unified programming interface and language assists program developers write multi-threaded programs that can perform both graphics and data-parallel compute processing on GPUs. The same GPU programming language model can be used to describe both graphics shaders and compute kernels, and the same data structures and resources may be used for both graphics and compute operations. Developers can use multithreading efficiently to create and submit command buffers in parallel.

20 Claims, 10 Drawing Sheets

Related U.S. Application Data

(60) Provisional application No. 62/005,821, filed on May 30, 2014.

(56) References Cited

U.S. PATENT DOCUMENTS

| | | | |
|---|---|---|---|
| 5,724,590 | A | 3/1998 | Goettelmann |
| 6,058,438 | A | 5/2000 | Diehl |
| 6,665,688 | B1 | 12/2003 | Callahan, II |
| 7,173,623 | B2 | 2/2007 | Calkins |
| 7,434,213 | B1 | 10/2008 | Prakash |
| 7,659,901 | B2 | 2/2010 | Toelle |
| 7,746,347 | B1 | 6/2010 | Brown |
| 7,800,620 | B2 | 9/2010 | Tarditi, Jr. |
| 8,044,951 | B1 | 10/2011 | Brown |
| 8,149,242 | B2 | 4/2012 | Langyel |
| 8,274,517 | B2 | 9/2012 | Boyd |
| 8,477,143 | B2 | 7/2013 | Harper |
| 8,566,537 | B2 | 10/2013 | Ni |
| 8,595,701 | B2 | 11/2013 | Li |
| 2003/0056083 | A1 | 3/2003 | Bates |
| 2004/0160446 | A1 | 8/2004 | Gosalia |
| 2005/0041031 | A1* | 2/2005 | Diard .............. G09G 5/393 345/505 |
| 2005/0122330 | A1 | 6/2005 | Boyd |
| 2005/0237330 | A1 | 10/2005 | Stauffer |
| 2006/0012604 | A1 | 1/2006 | Seetharamaiah |
| 2006/0080677 | A1 | 4/2006 | Louie |
| 2006/0098018 | A1 | 5/2006 | Tarditi |
| 2007/0033572 | A1 | 2/2007 | Donovan |
| 2007/0294666 | A1 | 12/2007 | Papakipos |
| 2008/0001952 | A1 | 1/2008 | Srinivasan |
| 2008/0141131 | A1* | 6/2008 | Cerny ............... G06F 9/45516 715/716 |
| 2008/0303833 | A1* | 12/2008 | Swift ................. G06T 1/20 345/505 |
| 2008/0303834 | A1* | 12/2008 | Swift ................. G06T 1/20 345/522 |
| 2009/0125894 | A1 | 5/2009 | Nair |
| 2009/0217249 | A1 | 8/2009 | Kim |
| 2009/0284535 | A1 | 11/2009 | Pelton |
| 2009/0307699 | A1 | 12/2009 | Munshi |
| 2010/0047510 | A1 | 2/2010 | Couvillion |
| 2010/0277486 | A1 | 11/2010 | Bhoovaraghavan |
| 2011/0004827 | A1 | 1/2011 | Doerr |
| 2011/0063296 | A1 | 3/2011 | Bolz |
| 2011/0087864 | A1 | 4/2011 | Duluk |
| 2011/0246973 | A1 | 10/2011 | Meijer |
| 2011/0314444 | A1 | 12/2011 | Zhang |
| 2011/0314458 | A1 | 12/2011 | Zhu |
| 2012/0131545 | A1 | 5/2012 | Linebarger |
| 2012/0147021 | A1 | 6/2012 | Cheng |
| 2012/0242672 | A1 | 9/2012 | Larson |
| 2013/0007703 | A1 | 1/2013 | Auerbach |
| 2013/0063456 | A1* | 3/2013 | Blanco ............... G06T 1/60 345/530 |
| 2013/0141443 | A1 | 6/2013 | Schmit |
| 2013/0159630 | A1 | 6/2013 | Lichmanov |
| 2013/0169642 | A1 | 7/2013 | Frascati |
| 2013/0187935 | A1 | 7/2013 | Wexler |
| 2013/0198494 | A1 | 8/2013 | Grover |
| 2013/0265309 | A1 | 10/2013 | Goel |
| 2014/0040855 | A1 | 2/2014 | Wang |
| 2014/0053161 | A1 | 2/2014 | Sadowski |
| 2014/0337321 | A1 | 11/2014 | Coyote |
| 2014/0354658 | A1 | 12/2014 | Dotsenko |
| 2014/0362093 | A1 | 12/2014 | Lorach |
| 2015/0109293 | A1 | 4/2015 | Wang |
| 2015/0179142 | A1 | 6/2015 | Lehtinen |
| 2015/0221059 | A1 | 8/2015 | Baker |
| 2015/0310578 | A1 | 10/2015 | You |
| 2016/0291942 | A1 | 10/2016 | Hutchison |
| 2016/0350245 | A1 | 12/2016 | Shen |

FOREIGN PATENT DOCUMENTS

| | | |
|---|---|---|
| CN | 103262038 A | 8/2013 |
| CN | 103392171 A | 11/2013 |
| WO | 2012082423 | 6/2012 |

OTHER PUBLICATIONS

Chris Lattner, "LLVM & LLVM Bitcode Introduction," Jan. 1, 2013 (Jan. 1, 2013), XP055206788, Retrieved from the Internet: URL: http://pllab.cs.nthu.edu.tw/cs240402/lectures/lectures_2013/LLVM Bitcode Introduction.pdf [retrieved on Aug. 7, 2015].

First Office Action received in Chinese Patent Application No. 201580028375.1, dated May 14, 2018.

Foley et al., "Spark: Modular, Composable Shaders for Graphics Hardware," [Retrieved from the Internet on Mar. 13, 2019] <http://www.cs.cmu.edu/afs/cs.cmu.edu/afs/cs.cmu.edu/academic/class/15869-f11/www/readings/foley11_spark.pdf> 2011.

Helge Rhodin, "A PTX Code Generator for LLVM," Oct. 29, 2010 (Oct. 29, 2010), pp. 1-63, XP055208570, Saarbrucken, Germany, Retrieved from the Internet: URL: http://compilers.cs.uni-saarland.de/publications/theses/rhodin_bsc.pdf [retrieved on Aug. 19, 2015].

Holk, Eric et al.; "GPU Programming in Rust: Implementing High-Level Abstractions in a Systems-Level Language"; IEEE International Symposium on Parallel & Distributed Processing, Workshops and PhD Forum; May 20, 2013; pp. 315-324.

Ivan Nevraev: "Introduction to Direct3D 12", Apr. 4, 2014 (Apr. 4, 2014), pp. 1-43, XP55203398, Retrieved from the Internet: URL:https://www.slideshare.net/DevCentralAMD/introduction-to-dx12-by-ivan-nevraev.

Kuan-Hsu Chen et al, "An automatic superword vectorization in LLVM," 2010, In 16th Workshop on Compiler Techniques for High-Performance and Embedded Computing, pp. 19-27, Taipei, 2010.

Lattner, Chris, "The Architecture of Open Source Applications: Elegance, Evolution, and a Few Fearless Hacks: LLVM," Mar. 2011, Retrieved from the Internet: URL: http://www.aosabook.org/en/llvm.html [retrieved on Apr. 7, 2014].

LLVM Language Reference Manual, LLVM Project, Apr. 7, 2014, Retrieved from the Internet: URL: http://llvm.org/docs/LangRef.html [retrieved on Apr. 7, 2014].

Matt Sandy: "DirectX 12", Mar. 20, 2014 (Mar. 20, 2014), XP002742458, Retrieved from the Internet: URL: http://blogs.msdn.com/b/directx/archive/2014/03/20/directx-12.aspx [retrieved on Jul. 20, 2015].

McDonnel et al., "Towards Utilizing GPUs in Information Visualization: A Model and Implementation of Image-Space Operation," [Retrieved from the Internet on Mar. 13, 2019] <https://ieeexplore.ieee.org/stamp/stamp.jsp?tp=&arnumber=5290718> 2009.

Miranda et al., "Erbium: A Deterministic, Concurrent Intermediate Representation for Portable and Scalable Performance," [Retrieved from the internet on Mar. 13, 2019] <http://delivery.acm.org/10.1145/1790000/1787312/p119-miranda.pdf?ip=151.207.250.61&id=1787312&acc=ACTIVE%2> 2010.

Office Action received in European Patent Application No. 15727811.0, dated Mar. 29, 2018.

Office Action received in European Patent Application No. 15730892.5, dated Jun. 8, 2018.

OpenGL Reference Manual, The Official Reference Document for OpenGL, Release 1, 1994, pp. 1-257.

Shih-Wei Liao, "Android RenderScript on LLVM," Apr. 7, 2011 (Apr. 7, 2011), XP055206785, Retrieved from the Internet: URL: https://events.linuxfoundation.org/slides/2011/lfcs/lfcs2011_llvm_liao.pdf [retrieved on Aug. 7, 2015].

* cited by examiner

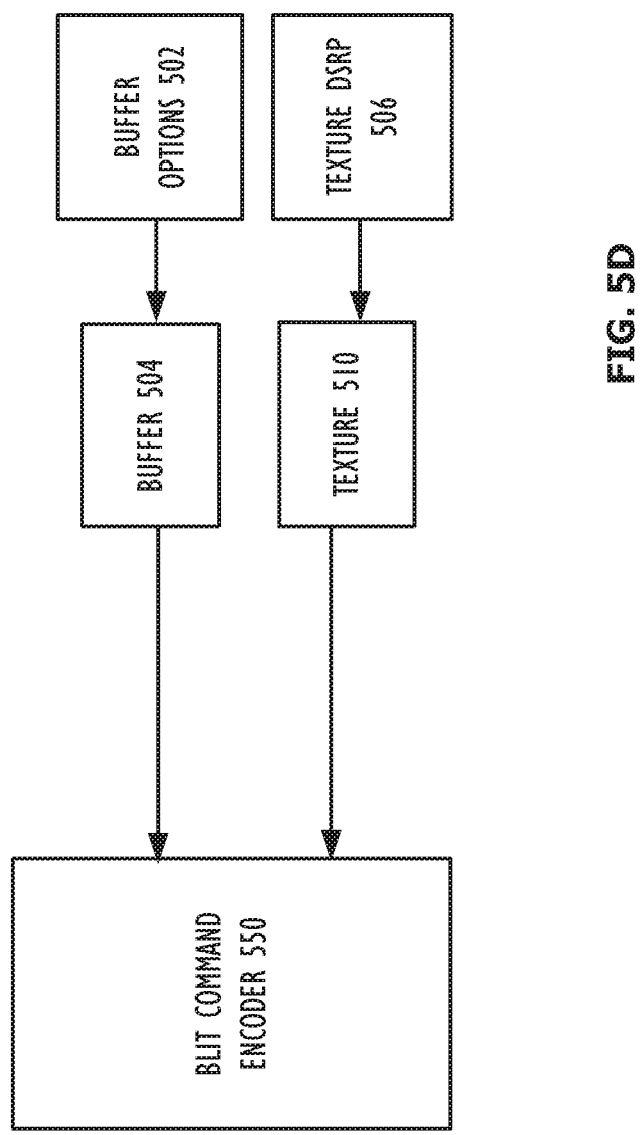

SYSTEM AND METHOD FOR UNIFIED APPLICATION PROGRAMMING INTERFACE AND MODEL

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

This disclosure relates generally to the field of computer programming. More particularly, but not by way of limitation, it relates to a programming interface and language for programming kernels for execution on a graphical processor unit.

Graphics processor units (GPUs) have become more and more important for processing data-parallel graphics tasks. Developers have also recognized that non -graphics data-parallel tasks can be handled by GPUs, taking advantage of their massive parallel capabilities. Vendors and standards organizations have created application programming interfaces (APIs) that make graphics data-parallel tasks easier to program. Similarly, vendors and standards organizations have created different APIs that make non-graphics data-parallel tasks easier to program. However, these high-level APIs have resulted in performance degradation, as well as making combining graphics and computing data-parallel tasks less convenient, because of the need to use different APIs for each type of task.

SUMMARY

In one embodiment, a non-transitory computer readable medium comprising instructions stored thereon to support both graphics and data-parallel computation workloads for a graphics processing unit (GPU) is provided. The instructions stored on the computer readable medium when executed may cause one or more processors to create a command buffer as a single-use object, where the command buffer contains encoded commands and the encoded commands represent a native command format that a GPU can execute and are store in the command buffer prior to the command buffer being submitted for execution. The instructions when executed may also cause the one or more processors to append one or more command buffers to a command queue and submit the command buffer to the GPU for execution. In one embodiment, the order in which command buffers are executed is determined by an order of the one or more command buffers in the command queue.

In another embodiment, an apparatus is provided which includes a processing device comprising a CPU and a GPU, a memory, and a processor embedded in the processing device which is configured to execute program code stored in the memory. The program code may be configured to create a command buffer as a single-use object, the command buffer containing encoded commands, where the encoded commands represent a native command format that the GPU can execute and are stored in the command buffer prior to the command buffer being submitted for execution. The program code may also be configured to append one or more command buffers to a command queue, and submit the command buffer to the GPU for execution. In one embodiment, the order in which command buffers are executed is determined by an order of the one or more command buffers in the command queue.

In yet another embodiment, a method for supporting both graphics and data -parallel computation workloads for a GPU is provided. The method includes creating a command buffer as a single-use object, the command buffer containing encoded commands, where the encoded commands represent a native command format that a GPU can execute and are stored in the command buffer prior to the command buffer being submitted for execution. The method may also include appending one or more command buffers to a command queue, and submitting the command buffer to the GPU for execution. The order in which command buffers are executed may be determined by an order of the one or more command buffers in the command queue.

BRIEF DESCRIPTION OF THE DRAWINGS

FIGS. 5A-5D are block diagrams illustrating relationships between command model objects according to one embodiment.

DETAILED DESCRIPTION

Figure 1:
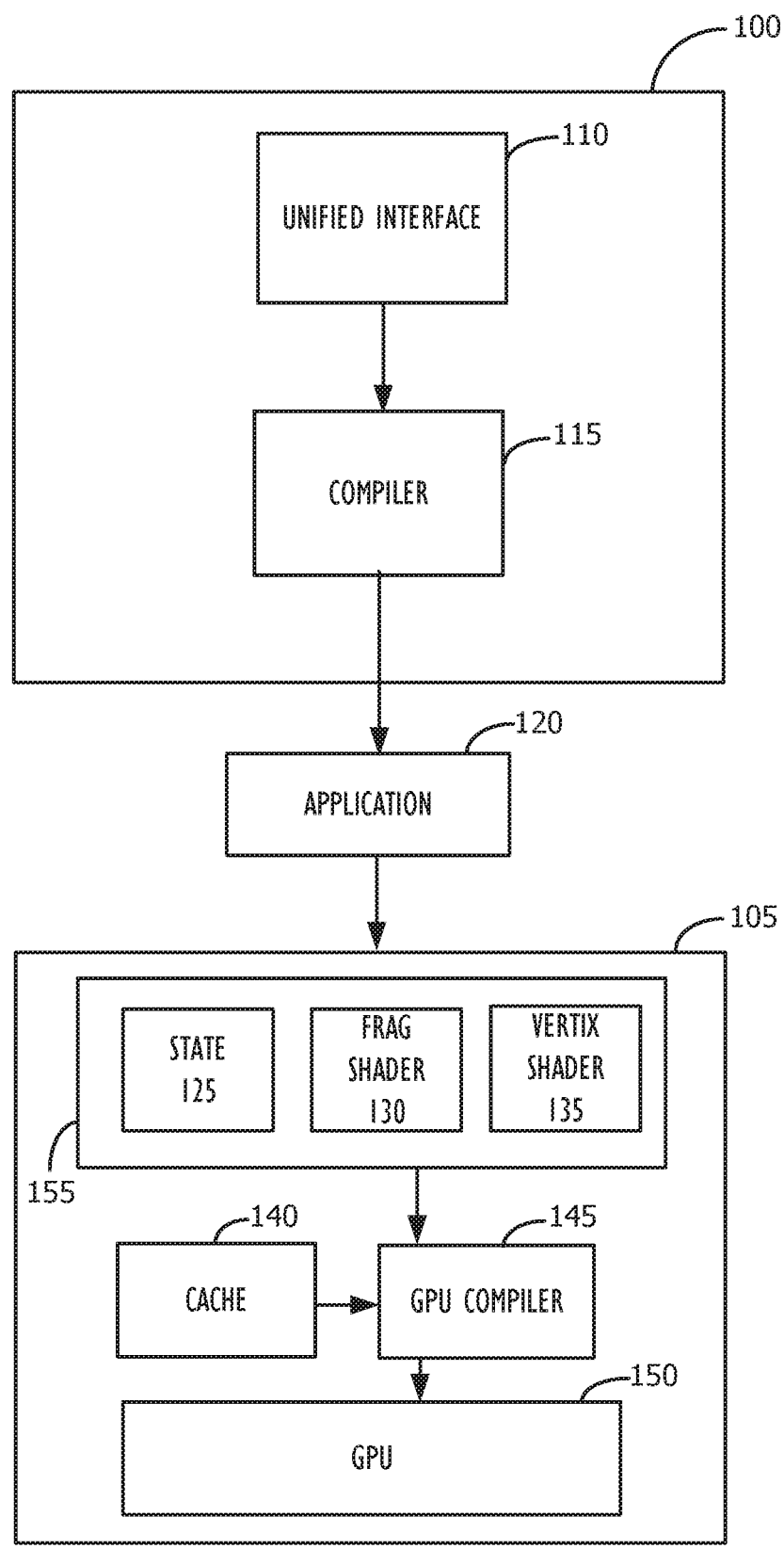
FIG. 1 is a block diagram illustrating compilation, linking, and execution of a program according to one embodiment.

A graphics processor unit (GPU) is a specialized electronic circuit designed to rapidly manipulate and alter memory to accelerate the creation of images in a frame buffer intended for output to a display. A GPU is efficient at manipulating computer graphics and has a highly parallel structure that makes it more efficient than a general -purpose computer processor (CPU) where processing of large blocks of data is done in parallel. GPUs are also used for non-graphical parallel processing, sometimes referred to as "compute processing," in addition to graphics processing.

Embodiments described in more detail below allow software developers to prepare applications using a unified programming interface and language designed to assist developers to write efficient multi-threaded programs that can perform both graphics and data-parallel compute (non-graphics) processing on GPUs. The developer can integrate graphics and computation tasks much more efficiently and without the need to learn and use multiple separate or redundant frameworks and without the need to encode commands in the order in which they should be executed.

In one embodiment, the same GPU programming language model can be used to describe both graphics shaders and compute kernels, as the same data structures and resources may be used for both graphics and compute operations. Developers can use multithreading efficiently to create and submit command buffers in parallel.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of application programming interfaces having the benefit of this disclosure.

Turning now to FIG. 1, a developer computer system 100 and a target computer system 105 are illustrated in block diagram form according to one embodiment. A developer can create and submit source code in the unified programming interface 110, which can be a GPU-specific programming language. The unified programming interface 110 may provide a single framework for developers to write their GPU programing code on. Once the code is written, it may be directed to a compiler 115, which can be a compiler for a GPU-specific programming language, and which may parse the source code and generate a machine-independent programming language -independent representation. The result may then be distributed from the developer computer system 100 to application 120. Application 120 can contain the shader code in a device-independent form (in addition to everything else the application contains: CPU code, text, other resources, etc.).

The application 120 may be delivered to the target machine 105 in any desired manner, including electronic transport over a network and physical transport of machine-readable media. This generally involves delivery of the application 120 to a server (not shown in FIG. 1) from which the target system 105 may obtain the application 120. The application 120 may be bundled with other data, such as run-time libraries, installers, etc. that may be useful for the installation of the application 120 on the target system 105. In some situations, the application 120 may be provided as part of a larger package of software.

Upon launch of the application 120, one action performed by the application can be creation of a collection of pipeline objects 155 that may include state information 125, fragment shaders 130, and vertex shaders 135, the application may be compiled by an embedded GPU compiler 145 that compiles the representation provided by the compiler 115 into native binary code for the GPU 150. The compiled native code may be cached in cache 140 or stored elsewhere in the target system 105 to improve performance if the same pipeline is recreated later, such as during future launches of the application. Finally, the GPU 150 may execute the native binary code, performing the graphics and compute kernels for data parallel operations.

Figure 2:
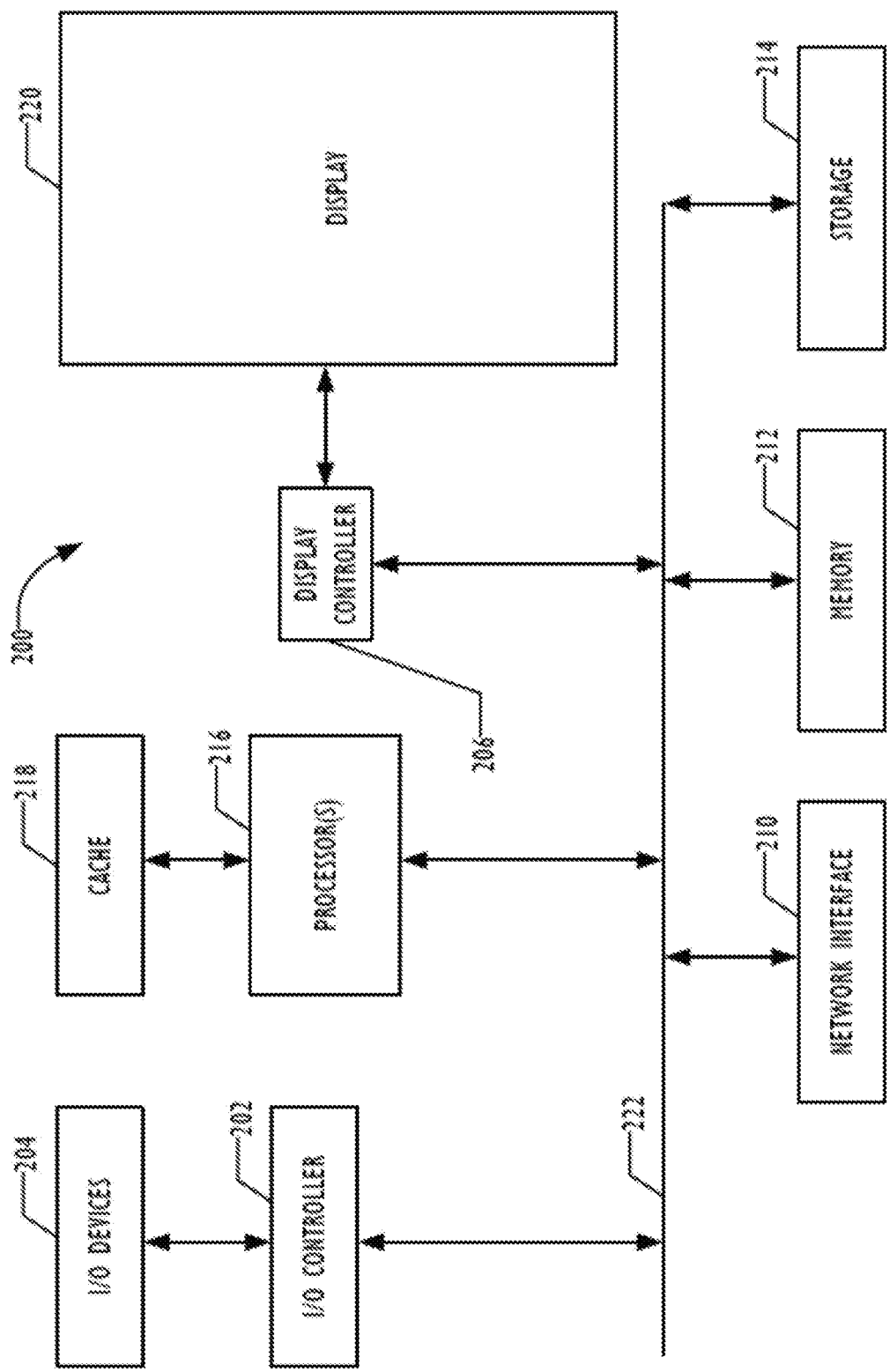
FIG. 2 is a block diagram illustrating a computer system for executing programs on a graphical processor unit according to one embodiment.

Referring now to FIG. 2, a block diagram illustrates a computer system 200 that can serve as the developer system 100 according to one embodiment. While FIG. 2 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, tablets, etc.) which have fewer components or perhaps more components may also be used to implement one or more embodiments.

As illustrated in FIG. 2, the computer system 200, which is a form of a data processing system, includes a bus 222 which is coupled to a microprocessor(s) 216, which may be CPUs and/or GPUs, a memory 212, which may include one or both of a volatile read/write random access memory (RAM) and a read-only memory (ROM), and a non-volatile storage device 214. The microprocessor(s) 216 may retrieve instructions from the memory 212 and the storage device 214 and execute the instructions using cache 218 to perform operations described above. The link 222 interconnects these various components together and also interconnects these components 216, 218, 212, and 214 to a display controller 206 and display device 220 and to peripheral devices such as input/output (I/O) devices 204 which may be mice, keyboards, touch screens, modems, network interfaces, printers and other devices which are well known in the art. Typically, the input/output devices 204 are coupled to the system through input/output controllers 202. Where volatile RAM is included in memory 212, the RAM is typically implemented as dynamic RAM (DRAM), which requires power continually in order to refresh or maintain the data in the memory. The display controller 206 and display device 220 may optionally include one or more GPUs to process display data.

The storage device 214 is typically a magnetic hard drive, an optical drive, a non-volatile solid-state memory device, or other types of memory systems, which maintain data (e.g. large amounts of data) even after power is removed from the system. While FIG. 2 shows that the storage device 214 is a local device coupled directly to the rest of the components in the data processing system, embodiments may utilize a non-volatile memory which is remote from the system, such as a network storage device which is coupled to the data processing system through a network interface 210, which may be a wired or wireless networking interface. The link 222 may include one or more links connected to each other through various bridges, controllers, and/or adapters as is well known in the art. Although only a single element of each type is illustrated in FIG. 2 for clarity, multiple elements of any or all of the various element types may be used as desired.

Figure 3:
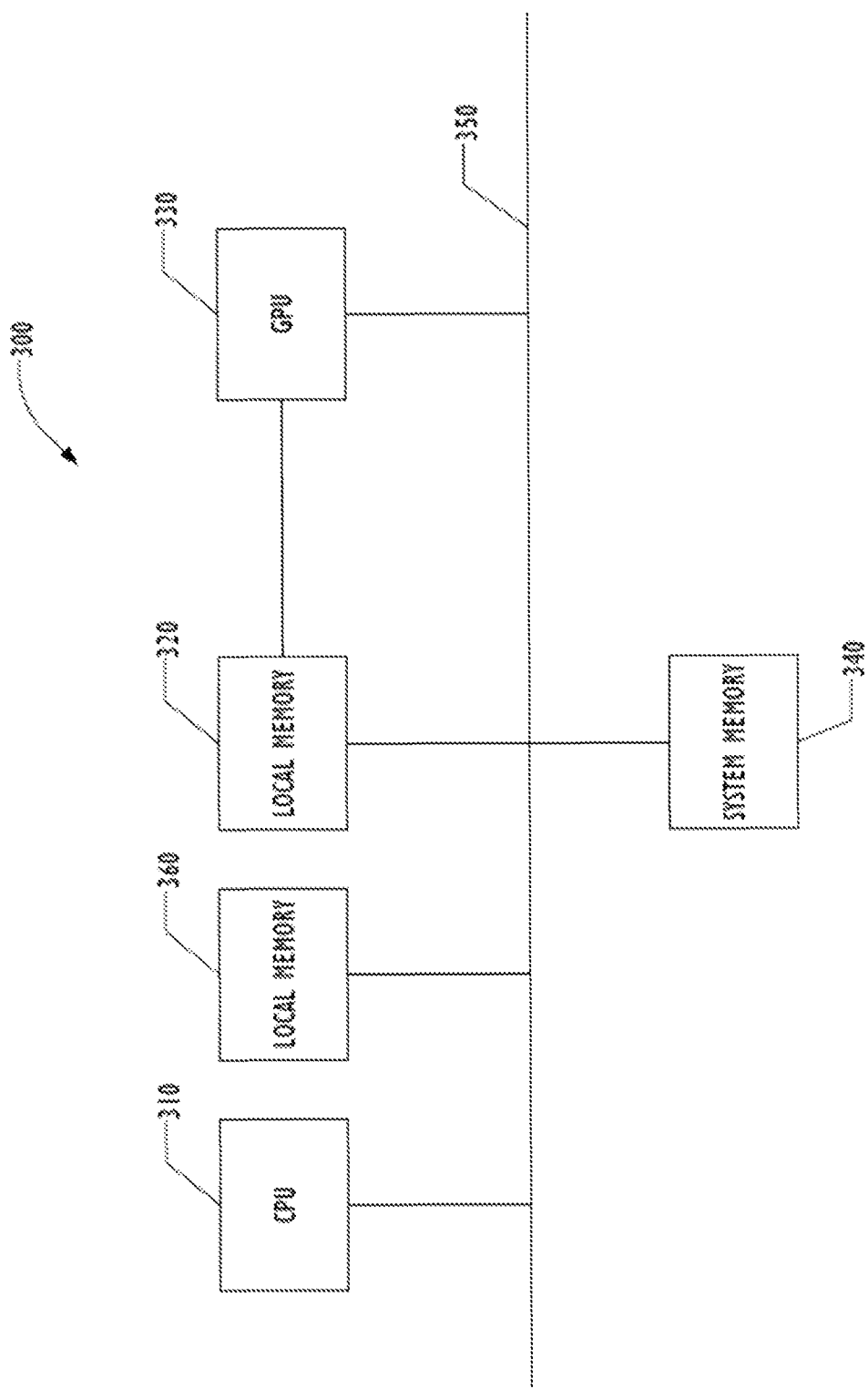
FIG. 3 is a block diagram illustrating a computer system for compiling and linking programs according to one embodiment.

Referring now to FIG. 3, a block diagram illustrates a computing system 300 that can serve as the target computer system 150 according to one embodiment. While FIG. 3 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, tablets, etc.) which have fewer components or perhaps more components may also be used to implement one or more embodiments.

Computing system 300 includes a CPU 310 and a GPU 330. In the embodiment illustrated in FIG. 3, CPU 310 and GPU 330 are included on separate integrated circuits (ICs) or packages. In other embodiments, however, CPU 310 and GPU 330, or the collective functionality thereof, may be included in a single IC or package.

In addition, computing system 300 also includes a system memory 340 that may be accessed by CPU 310 and GPU 330. In various embodiments, computing system 300 may comprise a supercomputer, a desktop computer, a laptop computer, a video-game console, an embedded device, a handheld device (e.g., a mobile telephone, smart phone, MP3 player, a camera, a GPS device, or other mobile device), or any other device that includes or is configured to include a GPU. Although not illustrated in FIG. 3, computing system 300 may also include conventional elements of a computing system, including a display device (e.g., cathode-ray tube, liquid crystal display, plasma display, etc.) for displaying content (e.g., graphics, video, etc.) of computing system 300, as well as input devices (e.g., keyboard, touch pad, mouse, etc.), storage devices (e.g., hard disc, optical disc, etc.) and communication devices (e.g., network interface). Any other elements may be included as desired. Although illustrated as coupled by a common communication link 350, multiple links 350 may be employed with the CPU 310 and GPU 330 connected to separate but interconnected links 350, as desired.

GPU 330 assists CPU 310 by performing certain special functions, such as graphics-processing tasks and data-parallel, general-compute tasks, usually faster than CPU 310 could perform them in software.

GPU 330 is coupled with CPU 310 and system memory 340 over link 350. Link 350 may be any type of bus or communications fabric used in computer systems, including a peripheral component interface (PCI) bus, an accelerated graphics port (AGP) bus, a PCI Express (PCIE) bus, or another type of link, including non-bus links. If multiple links 350 are employed, they may be of different types.

In addition to system memory 340, computing system 300 may include a local memory 320 that is coupled to GPU 330, as well as to link 350. Local memory 320 is available to GPU 330 to provide access to certain data (such as data that is frequently used) faster than would be possible if the data were stored in system memory 340. Local memory 360 may be available to CPU 310 to provide access to data such as binaries stored in the local memory 360.

Although a single CPU 310 and GPU 330 are illustrated in FIG. 3, embodiments may employ any number of CPUs 310 and GPUs 330 as desired. Where multiple CPUs 310 or GPUs 330 are employed, each of the CPUs 310 and GPUs 330 may be of different types and architectures. Portions of the application 120 may be executed on different GPUs 330 as desired. In addition, the computer system 300 may employ one or more specialized co-processor devices (not illustrated in FIG. 3), such as cryptographic co-processors, which may be coupled to one or more of the CPUs 310 and GPUs 330, using the link 350 or other links as desired.

Figure 4:
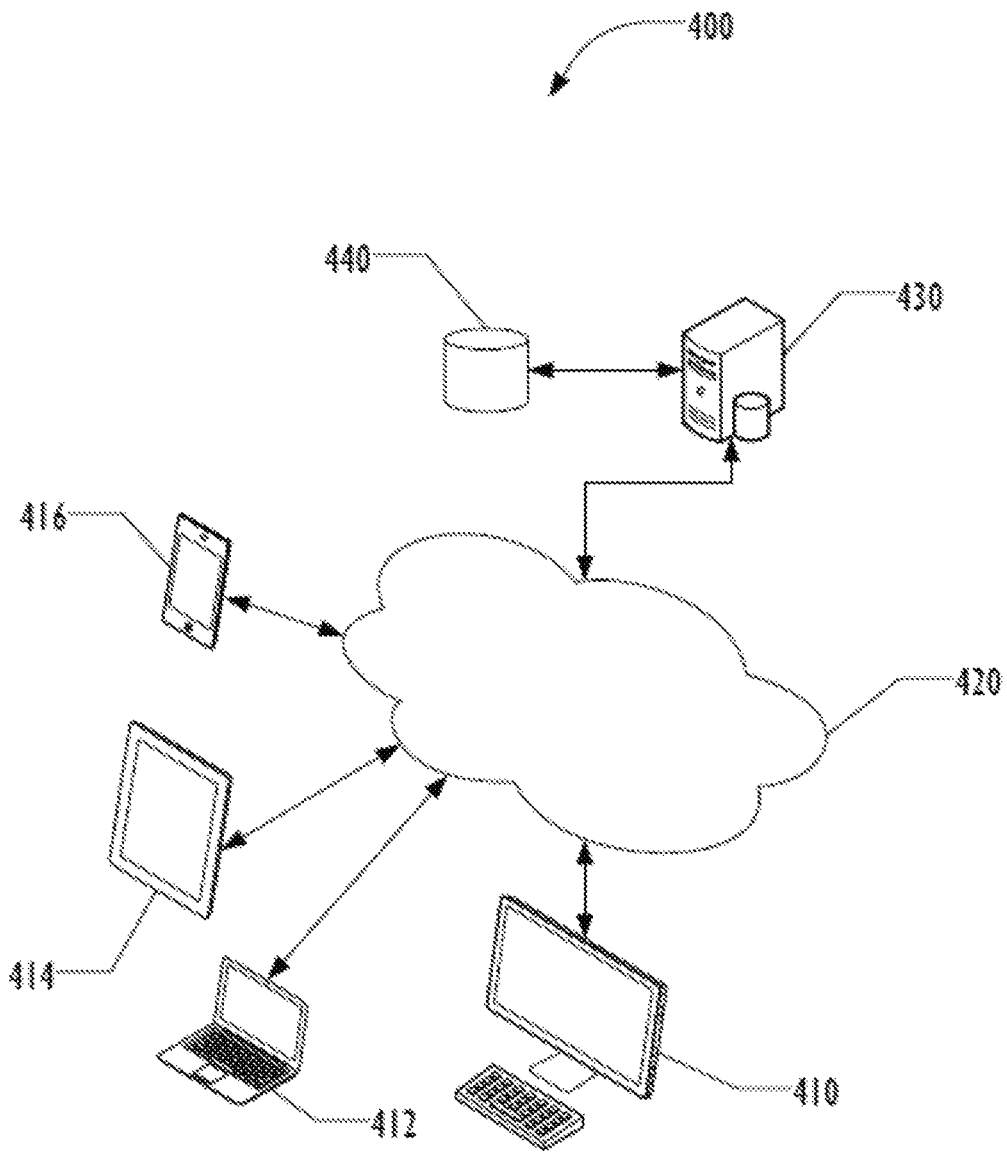
FIG. 4 is a block diagram illustrating a networked system according to one embodiment.

Turning now to FIG. 4, a block diagram illustrates a network of interconnected programmable devices 400, including server 430 and an associated datastore 440, as well as a desktop computer 410, a laptop 412, a tablet 414, and a mobile phone 416. Any of these programmable devices may be the developer system 100 or the target system 105 of FIG. 1. The network 420 that interconnects the programmable devices may be any type of network, wired or wireless, local or wide area, public or private, using any desired network communication protocols for transport of data from one system to the other. Although illustrated as a single network 420, any number of interconnected networks may be used to connect the various programmable devices, which may employ different network technology. In one example, the desktop workstation 410 may be the developer system 100 of FIG. 1, distributing the application 120 to the server 430, which in turn may distribute the application 120 to multiple devices 412, 414, and 416, each of which may employ a different GPU as well as other different components.

We now turn to the unified programming interface, programming language and language model. The specific syntax illustrated below for the programming language is an example and by way of illustration only, and different syntax may be used as desired. The programming language complies with a language model that allows developers to use low-level data structures for programming both graphics and compute (non-graphics) data-parallel tasks on kernels on the GPU, without having to worry about the specific GPU that will eventually execute the program. The following description of the programming language and language model is Copyright 2014 Apple Inc. This document describes the language model for a Unified Graphics and Compute Language according to one embodiment. With the language, both graphics and compute programs can be written with a single, unified language, which allows tighter integration between the two.

Figure 5A:
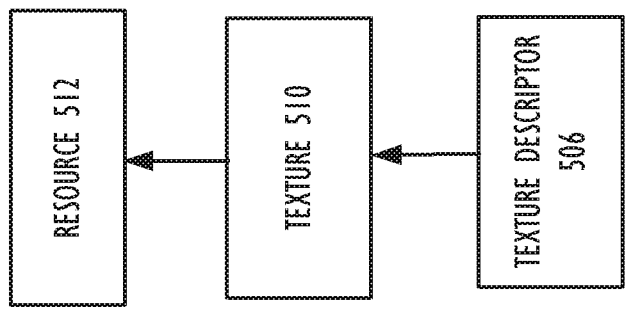

Referring to FIG. 5A, a block diagram illustrates some of the basic objects used in the programming language and command model for the united programming interface and their relationships. A texture object 510 (e.g., Texture in the programming language) may represent an allocation of GPU memory that is organized with a specified pixel format for a texture image. For example, a texture object may represent GPU memory organized for a one dimensional (1D), two dimensional (2D), or 3 dimensional (3D) texture image, arrays of 1D or 2D texture images, or a cubemap texture image. Resource protocol 512 (e.g., Resource) may represent a generic allocation of GPU memory. Texture 510 may be created in the unified programming interface by calling specific methods.

As shown in FIG. 5A, texture protocol 510 may conform to resource protocol 512. Texture descriptor object 506 and sampler object 508 may be used in the construction of texture object 510.

Texture descriptor object 506 may include mutable objects that describe texture properties. The properties may include size (e.g., width, height, and depth), pixel format, and whether mipmaps are used. Pixel format may specify how texture pixels store their color, depth, or stencil data internally. In general, there may be three varieties of pixel formats: ordinary, packed, and compressed. A GPU can read all formats unless noted as being restricted to a particular feature level. In general, a GPU can also render to all color formats (GPU Renderable), except for shared exponent (e.g., AKPixelFormatSE5BGR9Float), signed normalized, and compressed formats.

Figure 5B:
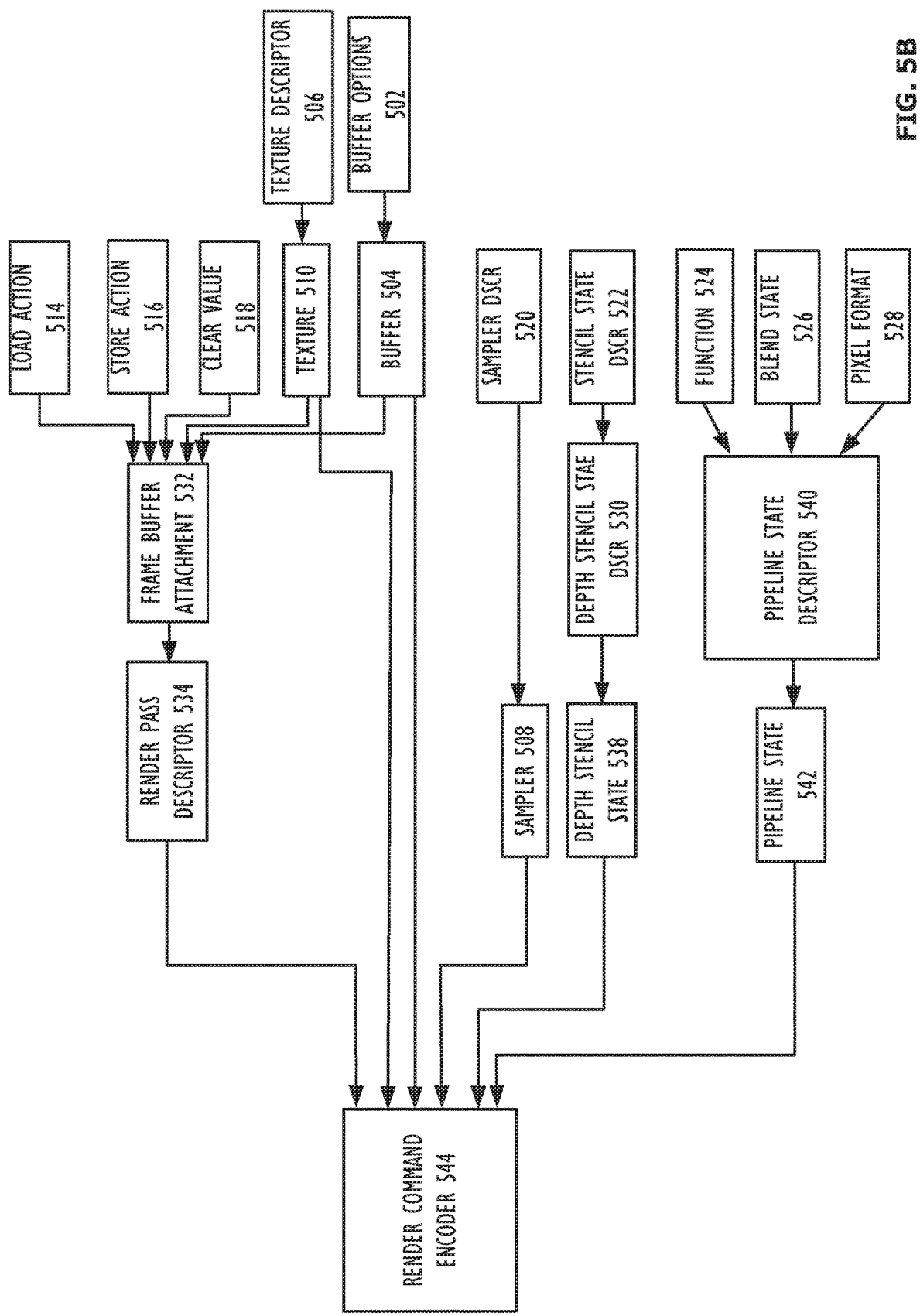

FIG. 5B provides a detailed block diagram illustrating relationships between various objects and classes in the unified programming model and language. A buffer options object 502 may be used in constructing a buffer 504 and texture descriptor object 506 may be used in constructing a texture 510. Buffer 504 and texture 510 may then be used as inputs for constructing a frame buffer attachment 532 which may itself be used in construction of a frame buffer 536. In one embodiment, to construct a frame buffer 536, first two texture objects 510 may be constructed which may then be used to construct two frame buffer attachments 532 (i.e. color attachment and depth attachment). The frame buffer attachment 532 may use the texture objects 510 to represent an array of pixels that is a destination for a specified type of fragment data such as color buffer, depth buffer, or stencil buffer. For fragment operations such as blending, the frame buffer attachment storage may serve as both source and destination. The frame buffer attachment 532 may act as an object bound to a single frame buffer object 536.

In one embodiment, to construct a new autoreleased frame buffer attachment object 532 (e.g., FramebufferAttachment), various FramebufferAttachment methods which may take a texture object 510 as an input value may be used. The texture object 510 may use a stencil-capable pixel format, such as AKPixelFormatStencil8. In general, each render command (e.g., RenderCoomand) may have a set of configuration/states that may be set when the RenderCommand is initialized, and may be unchangeable thereafter. This object may be the "RenderPassDescriptor" (replacing FramebufferDescriptor). The Framebuffer object itself may be removed. On a RenderPassDescriptor, the user may need to set which textures will serve as the target color/depth/stencil textures and the load actions/store actions for each texture.

Methods for constructing the frame buffer attachment 532 may also receive as input values various properties. These include load action 514, store action 516 and clear value 518. Load action 514 and store action 516 may be frame buffer attachment properties that specify an action that is performed at either the start or end of command processing for a render command encoder, respectively, for the specified frame buffer attachment 532. For example, Load action may at the start of a render command, load the existing contents of the texture, so further rendering can blend over the existing contents. On a binning GPU, all rendering may be done to a small memory in the GPU, with the overall framebuffer divided into tiles to make it fit, as this memory may typically be smaller than the target textures. Each tile may be rendered in turn. The Load and Store actions may determine if and how the GPU copies data from the texture to this tile memory when the rendering of each tile begins, and similarly if and how data is copied back to memory when the rendering of a tile completes. Load action properties 514 include a property (e.g., LoadActionClear) for an action that writes the same value to every pixel in the specified frame buffer attachment 532, a property (e.g., LoadActionLoad) for an action that writes data to that attachment, and a property (e.g., LoadActionDontCare) to specify nothing should be copied. Store action property 516 may include a property (e.g., StoreActionStore) for an action that writes a single fragment value, a property (e.g., StoreActionMultisampleResolve) for an action that uses several sample points within a fragment to determine what to write, and a property (e.g., StoreActionDontCare) to specify nothing should be copied.

Clear value property 518 generally depends upon the pixel format of the texture, which may determine how the frame buffer attachment 532 is used. If the clear value property 518 signals that load action is clear, then the RenderPassDescriptor also defines which value that texture will be cleared to.

After the frame buffer attachment 532 has been constructed, it may be used in constructing a render pass descriptor object 534 which may be a mutable descriptor object that describes the frame buffer state. Render pass descriptor object 534 may consist of any state that must remain constant across an entire render pass, including the frame buffer attachments and the visibility counter buffer for which the hardware may declare which memory can be used to track traditional occlusion query data (i.e., the number of drawn pixels Once constructed, the frame buffer descriptor 534 may then be used in turn to create the render command encoder 544. After the render command encoder 544 has been created, it may use as inputs texture object 510, buffer object 504, sampler object 508, depth stencil state object 538, and pipeline state object 542 to configure what will be drawn into it and create a render command which may be rendered at a destination. A frame buffer descriptor can be configured as part of the beginning of a render command. Then, the application can append a sequence of SetPipelineState, SetInexpensiveState, and Draw commands to declare the set of objects that will be drawn into the frame buffer. In other words, for each render pass descriptors and/or render commands, there can be one or more input objects and draw commands issued, and then the render command can be ended by the application to tell the graphics system that no more commands will be appended.

As discussed above, sampler object 508 may be an immutable object constructed using a method which uses the sampler descriptor object 520 as an input value. Depth stencil state object 538 may be an immutable object that may be used in constructing the render command encoder object 544. Depth stencil state object 538 may itself be constructed using depth stencil state descriptor object 530 which may be a mutable state object that contains settings for depth and/or stencil state. For example, depth stencil state descriptor object 530 may include a depth value for setting the depth, stencil back face state and stencil front face state properties for specifying separate stencil states for front and back-facing primitives, and a depth compare function property for specifying how a depth test is performed. For example, leaving the value of the depth compare function property at its default value may indicate that the depth test always passes, which may mean an incoming fragment remains a candidate to replace the data at the specified location. If a fragment's depth value fails the depth test, the incoming fragment may be discarded. Construction of a custom depth stencil state descriptor object 530 itself may require creation of a stencil state object 522 which may be an immutable state object. Other graphics states may also be part of the pipeline. In general, a state object may be an object which may be built ahead of time, be immutable and used or reused frequently. A descriptor object, on the other hand, may be an object that is used temporarily to collect various configuration options, which once fully configured, may be used to build something else.

Pipeline state 542 may be an object containing compiled graphics rendering states, such as rasterization (including multisampling), visibility, and blend state. Pipeline state 542 may also contain programmable states such as two graphics shader functions to be executed on the GPU. One of these shader functions may be for vertex operations and one for fragment operations. The state in the pipeline state object 542 may generally be assembled and compiled at runtime. Pipeline state object 542 may be constructed using the pipeline state descriptor object 540 which may be a mutable descriptor object and a container for graphics rendering states. In general to construct Pipeline state object 542, first a pipeline state descriptor object 540 may be constructed and then its values may be set as desired. For example, a rasterization enabled property (BOOL type) may be set to NO, so that all primitives are dropped before rasterization and no fragments are processed. Disabling rasterization may be useful to obtain feedback from vertex-only transformations. Other possible values that may be set include vertex and fragment function properties that help specify the vertex and fragment shaders, and a value for the blend state that specifies the blend state of a specified frame buffer attachment. If frame buffer attachment 532 supports multisampling, then multiple samples can be created per fragment, and the following pipeline state properties can be set to determine coverage: the sampleCount property for the number of samples for each fragment, the sampleMask property for specifying a bitmask that is initially bitwise ANDed with the coveragemask produced by the rasterizer (by default, the sampleMask bitmask may generally be all ones, so a bitwise AND with that bitmask does not change any values); an alphaToCoverageEnabled property to specify if the alpha channel fragment output may be used as a coverage mask, an alphaToOneEnabled property for setting the alpha channel fragment values, and a sampleCoverage property specifying a value (between 0.0 and 1.0, inclusive) that is used to generate a coverage mask, which may then be bitwise ANDed with the coverage value produced by the rasterizer.

Pipeline state descriptor object 540 itself may be constructed using one or more objects that include function object 524, blend state 526, and pixel format 528. Function object 524 may represent a handle to a single function that runs on the GPU and may be created by compiling source code from an input value string. Function object 524 generally only relates to state values on graphics apps but not compute apps. Blend state 526 may be a mutable object containing values for blending. Blending may be a fragment operation that uses a highly configurable blend function to mix the incoming fragment's color data (source) with values in the frame buffer (destination). Blend functions may determine how the source and destination fragment values are combined with blend factors. Some of the properties that define the blend state may include a blending enabled property (BOOL value) for enabling blending; a writeMask property for specifying a bitmask that restricts which color bits are blended; rgbBlendFunciton and alphaBlendFunction properties for assigning blend functions for the RGB and Alpha fragment data; and sourceRGBBlendFactor, sourceAlphaBlendFactor, destinationRGBBlendFactor, and destinationAlphaBlendFactor properties for assigning source and destination blend factors.

Pixel format object 528 may specify the organization of individual pixels (e.g., texels) in a texture object. For example, pixel format object 528 may include properties specifying how texels store their color, depth, or stencil data internally. In particular, in the context of a Binning GPU, the compiler may need to know how the tile memory is to be formatted. For example, if there is one color texture, the compiler may need to know what format of data to store into the tile memory (For example, will the eventual rendering destination be an 8 bit or 32 bit color? An RGB or RGBA?). Thus the pipeline includes the frame buffer pixel formats to allow the compiler to generate this code. Then, once all the objects in a tile are rendered, the render pass descriptor's Store Action may determine if and how that data is copied out into the target texture.

Thus in summary, to construct and initialize the render command encoder object 544, in one embodiment, first one or more frame buffer attachments 532 each of which may contain the state of a destination for rendering commands (e.g., color buffer, depth buffer, or stencil buffer) may be constructed. Next, a mutable render pass object 534 that contains the frame buffer state, including its associated attachments may be constructed. After the render pass descriptor 534 is created, render command encoder object 544 can be constructed by calling a command buffer method (e.g., renderCommandEncoderWithFramebuffer) with the render pass descriptor 534 as an input value object.

A pipeline state object 542 to represent the compiled pipeline state, such as shader, rasterization (including multisampling), visibility, and blend state may be constructed, generally when an application is launched, by first creating the mutable descriptor object, pipeline state descriptor 540, and setting the desired graphics rendering state for the render-to-texture operation for pipeline state descriptor object 540. After pipeline state object 542 has been created, a render command encoder method (e.g., setPipelineState) may be called to associate the pipeline state object 542 to the render command encoder 544.

Figure 5C:
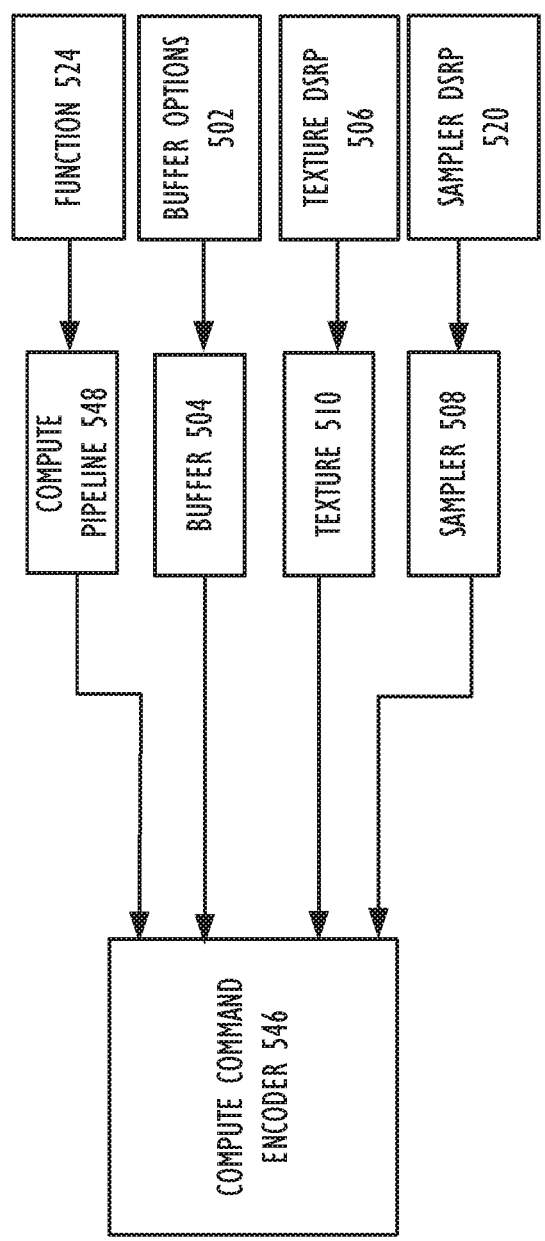

Referring to FIG. 5C, a block diagram illustrating the relationships between various objects and a compute command encoder is shown. To perform a data-parallel computation, a compute command encoder object 546 (e.g., ComputeCommandEncoder) may need to be created, for the data-parallel operations. Compute command encoder object 546, may be a container for data-parallel compute processing state and for code to translate that state into commands that can be executed on the GPU. To construct the compute command encoder object 546, a compute pipeline state 548 may first be created. Compute pipeline 548 may be a compute kernel that contains compiled code from the function object 524. The function object 524 may represent a compute function written with a GPU shading language. After it has been created, the compute pipeline object 548 may be specified for the compute command encoder 546. The compute pipeline object 548 may serve as an analogue to a render pipeline state and it may be created at application launch time from a compute pipeline descriptor, and then repeatedly used or referenced from a compute command encoder.

Resources such as buffer object 504, texture object 510, and sampler object 508 which contain the data to be processed and returned by the compute pipeline object 548 may be specified and binding points for those resources may be set. The compute pipeline object 548 may be set up and enqueued to run a specified number of times. In general, enqueued kernels can run in parallel and start whenever the GPU is available. If there is a dependency between kernels, a method may be called (e.g., enqueueBarrier) to ensure that one or more kernels are completed before dependent kernels are started. The enqueueBarrier method may also be a memory barrier, so all writes issued before the barrier are visible to all loads that occur after the barrier. Without such a barrier, there may not be any guarantees of memory coherency between simultaneously executing kernels.

In general, at a given moment, the compute command encoder object 546 can be associated with a number of resource objects (e.g., buffers, constant buffers, textures, and samplers) and to only one compute pipeline state 548. As discussed before, buffer options 502 may be used to construct buffer 504, texture descriptor 506 may be used to create texture 510, and sampler descriptor 520 may be used to generate sampler 508.

Referring to FIG. 5D, a block diagram illustrating the relationships between various objects and a blit command encoder is shown. Blit command encoder object 550 (e.g., BlitCommandEncoder) may provide methods for copying data between resources such as buffers and textures. Data copying operations may be necessary for image processing and texture effects, such as blurring or reflections. They may also be used to access image data that is rendered off-screen. Blit command encoder object 550 may also provide methods to fill textures with a solid color and to generate mipmaps. To perform such operations, a blit command encoder object 550 may be constructed using a command buffer method (e.g., blitCommandEncoder). After being constructed, blit command encoder object 550 may then call its methods to encode data copying commands onto a command buffer. As shown in FIG. 5D, blit command encoder object 550 may use buffer object 504 and texture object 510 as inputs for performing its operations.

Figure 6:
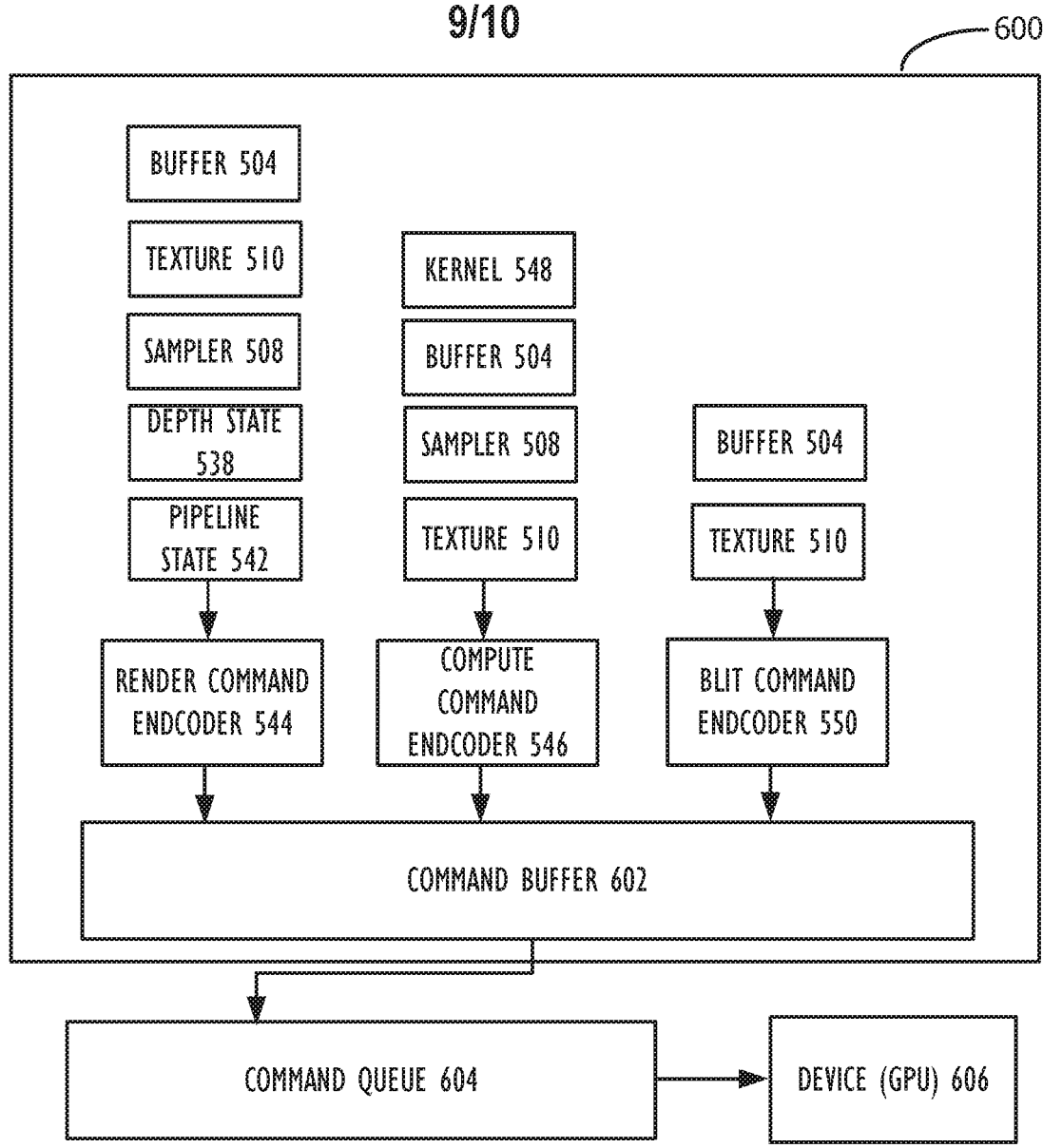
FIGS. 6 is a block diagram illustrating organization of the command submission model according to one embodiment.

Referring to FIG. 6, a block diagram illustrates organization of the command model in the united programming interface, in one embodiment. The command model may include various objects some of which may be transient and some non-transient. As shown, in a CPU thread 600, various framework commands may be submitted to each of the different command encoders: render command encoder 544, compute command encoder 546, and BLIT command encoder 550. As discussed above, the command encoders may be common interfaces for objects writing commands. In general, a command encoder may process the commands by translating commands and state from the programming language framework into a native command format that the GPU 606 can execute. A command encoder may be intended to be a short-lived, single-use, low-overhead object. Command encoder object methods may prepare encoded commands for the command buffet 602. While a command encoder is active, it may have the exclusive right to encode commands for its command buffer. Once encoding is completed, a method may be called to disconnect the encoder from its command buffer. To write further commands, a new command encoder or the same one as the previous encoder may be constructed.

As shown in FIG. 6, different command buffers can be built concurrently regardless of the types of command encoders used to build them. As discussed above, render command encoder 544 may use values from buffer 504, texture 510, sampler 508, depth stencil state 538, and pipeline state 542 to generate graphics rendering commands. Compute command encoder 546 may in turn use values from kernel 548, buffer 504, sampler 508, and texture 510 to generate data-parallel computation commands. Blit command encoder 550 may utilize buffer 504 and texture 510 to generate data copying commands.

After translating the commands into native command format and thus generating commands that may be executed by a GPU, each command encoder may append the translated commands into the command buffer 602. This may be done by calling a command encoder method to commit the commands to the command buffer 602. Command buffer 602 (e.g., CommandBuffer), may be a single-use object, having commands encoded into it which may be submitted once for execution. A single command buffer can contain a combination of graphics, compute, and blit commands. Thus, command buffer 602 may be a container for the series of encoded commands that will be executed by the device. In general, at any given time, only one command encoder may encode commands into a specific command buffer. After a command encoder is committed, the command encoder itself may be released. Then another command encoder can be created, where the new command encoder may have sole access to the command buffer.

After the commands are appended in command buffer 602, they may be transmitted to command queue 604. For each app, there may be at least one command queue 604, which may last the lifetime of the app. Each command queue 604 may contain a serial queue of command buffers 602 that are sent to the device or GPU 606 in a specified order for execution. In general, command buffers 602 are executed in the order in which they are added to the command queue 604.

GPU 606 may be a single GPU suitable for processing submitted commands. After command execution has been scheduled. A command buffer 602 may be considered scheduled after all its dependencies have been resolved and it has been sent to the hardware for execution.

A single-threaded app such as the one illustrated in FIG. 6, typically encodes one command buffer per frame and calls the command buffer commit method when encoding is complete to commit the command to the command queue. A single-threaded app can rely on an implied enqueue call before commit. However, in some scenarios, command buffers may be enqueued, but not submittable because they are dependent on other resources which are not yet ready or available (e.g., a blit operation that depends upon the completion of a rendering operation).

A multi-threaded app generally creates a command buffer per CPU thread and calls the enqueue method on each command buffer in the order that the GPU will execute them. Later when the encoding is complete for each command buffer, the app can call the commit method. In such a scenario, the app may determine when an enqueued buffer has the necessary resources to become eligible for execution.

Figure 7:
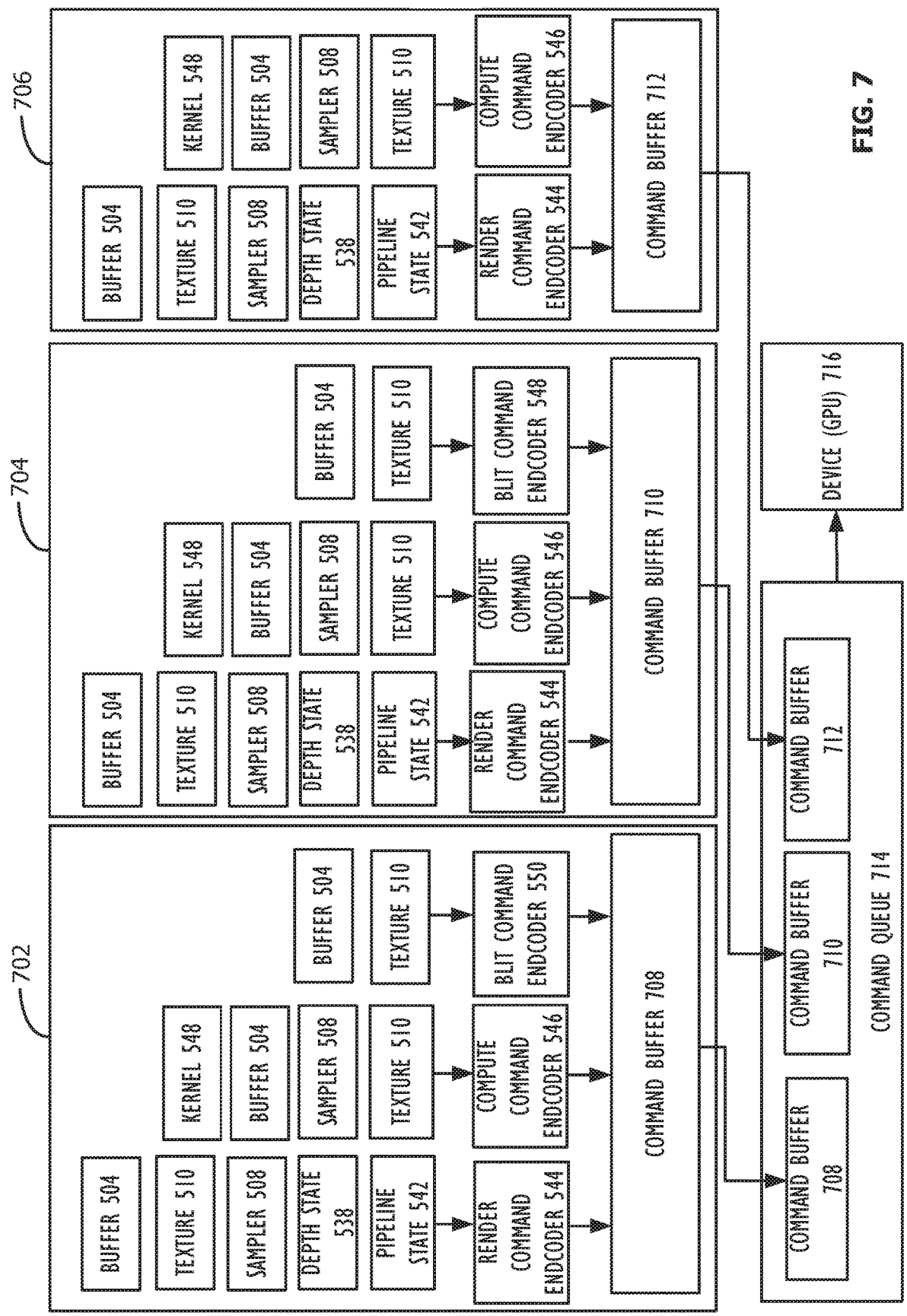
FIGS. 7 is a block diagram illustrating organization of a multi-thread command model according to one embodiment.

As discussed before, generally, only one CPU thread can access a command buffer at time. However, multithreaded applications can use one thread per command buffer to construct multiple command buffers in parallel. FIG. 7 illustrates an example of multithreaded applications with three threads. As shown, each of the threads 702, 704, and 706 has its own command buffer 708, 710, and 712, respectively. For each thread, one command encoder at a time may have access to its associated command buffer. When a command encoder object calls its commit method, previously specified commands may be appended to the command buffer, the command encoder object itself may be released, and a new command encoder object may now append commands to the command buffer. The command buffers 708, 710, and 712 may be executed by the GPU 716 in the order in which they are committed to the command queue 714.

In some scenarios, it may be desirable to break up a single render pass into multiple units of work to be encoded in parallel, presumably across a number of threads, such as threads 702, 704, and 706. Each thread may be able to execute independently in parallel, possibly on different processor cores. However, when dependencies are introduced in the task (e.g., intermediate results that must be completed before continuing), the threads require a synchronization mechanism. In one embodiment, the unified programming interface provides such a mechanism by including a protocol (e.g., ParallelRenderPassEncoder) which allows a single render-to-texture operation to be efficiently broken up across multiple threads. Each thread of those threads may be able to use an independent render command encoder to encode rendering commands for the same command buffer and to share the same frame buffer destination. After all the encoding threads have finished, the synchronization protocol (ParallelRenderPassEncoder) may be committed. The commands from the different render command encoders may then be chained together preserving the ordering of their original encoding thread construction, regardless of the order in which the different encoding threads performed their commit. This implementation may execute all the rendering commands together as a group in an efficient manner. In particular, the implementation may perform the load and store actions of the frame buffer only once, without intermediate save or restore operations occurring.

A variety of methods in the unified programming language manage having multiple units of work. These methods may include a renderCommandEncoder method which constructs a render command encoder object that encodes graphics rendering commands on a command buffer, where each command encoder can be assigned to its own thread. The methods also include the commit method which enables the execution of all commands in the command buffer that were encoded and appended by the render command encoders that ParallelRenderPassEncoder constructed. In general, all such render command encoder objects would call their commit method before ParallelRenderPassEncoder calls its commit method. Otherwise, an error may occur.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising instructions stored thereon to support workload management for a graphics processing unit (GPU), wherein the instructions, when executed, cause one or more processors to:
submit one or more commands to each of at least two different types of command encoders;
create two or more command buffers;
append the two or more command buffers to a command queue in a given order;
encode, with at least one of the at least two different types of command encoders, at least one command, wherein the at least one encoded command are stored in their respective command buffers prior to the command buffers being submitted to the GPU for execution;
determine when a commit command has been called on each of the two or more command buffers, wherein the commit command indicates the respective command buffer is eligible for submission to the GPU for execution;
commit the two or more command buffers to the GPU for execution after a respective determination has been made that each respective command buffer is eligible for submission to the GPU for execution; and
submit the two or more committed command buffers to the GPU for execution, wherein an order in which the two or more command buffers are executed is determined by the given order of the two or more command buffers in the command queue.

2. The non-transitory computer readable medium of claim 1, wherein the given order is specified before the encoding of the at least one command.

3. The non-transitory computer readable medium of claim 1, wherein the given order is specified after the encoding of the at least one command.

4. The non-transitory computer readable medium of claim 1, wherein the encoding of the at least one command is done in parallel by a plurality of central processing unit (CPU) threads.

5. The non-transitory computer readable medium of claim 1, wherein determining that a respective command buffer is eligible for submission comprises determining that any commands the respective command buffer depends on the output of have already been executed by the GPU.

6. The non-transitory computer readable medium of claim 1, wherein determining that a respective command buffer is eligible for submission comprises determining that all commands for the respective command buffer have been encoded.

7. The non-transitory computer readable medium of claim 1, wherein the at least two command encoders are chosen from a group consisting of: a render command encoder, a compute command encoder, or a BLIT command encoder.

8. An apparatus, comprising:
a processing device comprising a central processing unit (CPU) and a graphics processing unit (GPU); and
a memory, wherein the CPU is configured to execute program code stored in the memory to:
submit one or more commands to each of at least two different types of command encoders;
create two or more command buffers;
append the two or more command buffers to a command queue in a given order;
encode, with at least one of the at least two different types of command encoders, at least one command, wherein the at least one encoded command are stored in their respective command buffers prior to the command buffers being submitted to the GPU for execution;
determine when a commit command has been called on each of the two or more command buffers, wherein the commit command indicates the respective command buffer is eligible for submission to the GPU for execution;
commit the two or more command buffers to the GPU for execution after a respective determination has been made that each respective command buffer is eligible for submission to the GPU for execution; and
submit the two or more committed command buffers to the GPU for execution, wherein an order in which the two or more command buffers are executed is determined by the given order of the two or more command buffers in the command queue.

9. The apparatus of claim 8, wherein the given order is specified before the encoding of the at least one command.

10. The apparatus of claim 8, wherein the given order is specified after the encoding of the at least one command.

11. The apparatus of claim 8, wherein the encoding of the at least one command is done in parallel by a plurality of CPU threads.

12. The apparatus of claim 8, wherein determining that a respective command buffer is eligible for submission comprises determining that any commands the respective command buffer depends on the output of have already been executed by the GPU.

13. The apparatus of claim 8, wherein determining that a respective command buffer is eligible for submission comprises determining that all commands for the respective command buffer have been encoded.

14. The apparatus of claim 8, wherein the at least two command encoders are chosen from a group consisting of: a render command encoder, a compute command encoder, or a BLIT command encoder.

15. A method, comprising:
   submitting one or more commands to each of at least two different types of command encoders;
   creating two or more command buffers;
   appending the two or more command buffers to a command queue in a given order;
   encoding, with at least one of the at least two different types of command encoders, at least one command, wherein the at least one encoded command are stored in their respective command buffers prior to the command buffers being submitted to a graphics processing unit (GPU) for execution;
   determining when a commit command has been called on each of the two or more command buffers, wherein the commit command indicates the respective command buffer is eligible for submission to the GPU for execution;
   committing the two or more command buffers to the GPU for execution after a respective determination has been made that each respective command buffer is eligible for submission to the GPU for execution; and
   submitting the two or more committed command buffers to the GPU for execution, wherein an order in which the two or more command buffers are executed is determined by the given order of the two or more command buffers in the command queue.

16. The method of claim 15, wherein the given order is specified before the encoding of the at least one command.

17. The method of claim 15, wherein the given order is specified after the encoding of the at least one command.

18. The method of claim 15, wherein the encoding of the at least one command is done in parallel by a plurality of central processing unit (CPU) threads.

19. The method of claim 15, wherein determining that a respective command buffer is eligible for submission comprises determining that any commands the respective command buffer depends on the output of have already been executed by the GPU.

20. The method of claim 15, wherein determining that a respective command buffer is eligible for submission comprises determining that all commands for the respective command buffer have been encoded.

* * * * *